P. REISS.
CALCULATING MACHINE.
APPLICATION FILED OCT. 9, 1912.

1,156,313.

Patented Oct. 12, 1915.
8 SHEETS—SHEET 1.

Witnesses:
Robert I. Hulsizer
Edith C. Tate

Inventor:
Paul Reiss
by Byrnes Townsend & Brickenstein
Attys.

P. REISS.
CALCULATING MACHINE.
APPLICATION FILED OCT. 9, 1912.

1,156,313.

Patented Oct. 12, 1915.

8 SHEETS—SHEET 3.

Witnesses —
Robert J. Hulsizer
Edith C. Tate

Inventor
Paul Reiss
by
Byrnes Townsend & Brickenstein
Attys

P. REISS.
CALCULATING MACHINE.
APPLICATION FILED OCT. 9, 1912.
1,156,313.
Patented Oct. 12, 1915.
8 SHEETS—SHEET 4.
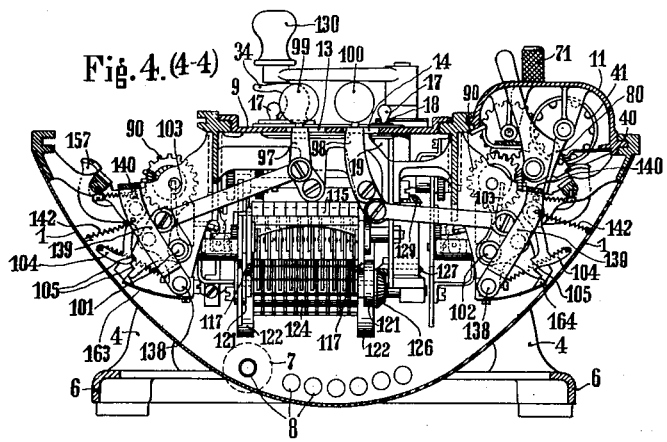
Fig. 4. (4-4)
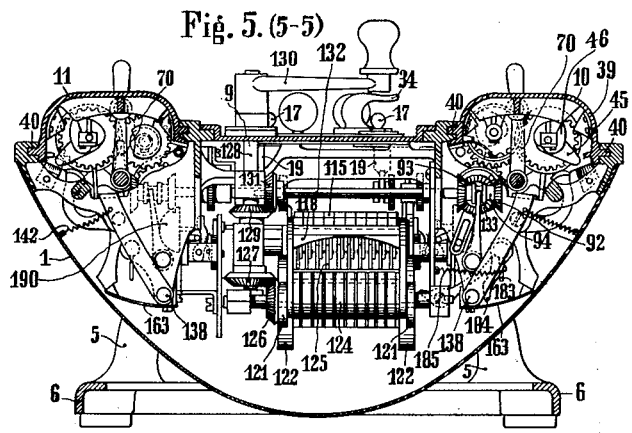
Fig. 5. (5-5)
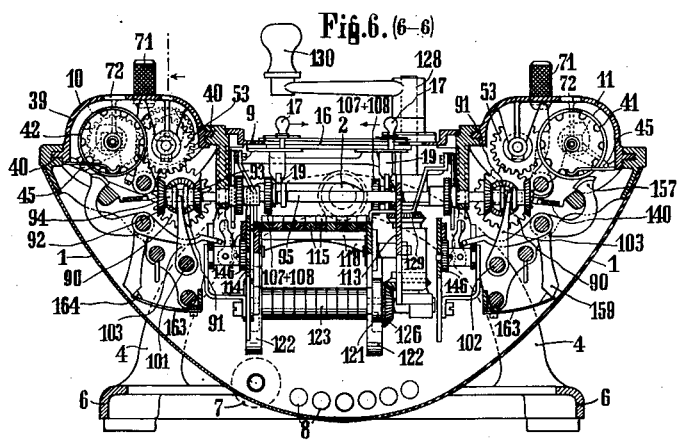
Fig. 6. (6-6)
Witnesses
Robert J. Hulsizer
Edith C. Tate.
Inventor
Paul Reiss
by
Byrnes Townsend Brickenstein
Atty's.

P. REISS.
CALCULATING MACHINE.
APPLICATION FILED OCT. 9, 1912.

1,156,313.

Patented Oct. 12, 1915.
8 SHEETS—SHEET 5.

Fig. 7. (7-7)

Witnesses—
Robert J. Hulsiger
Edith C. Tate.

Inventor Paul Reiss
by
Byrnes Townsend & Brickenstein
Attys.

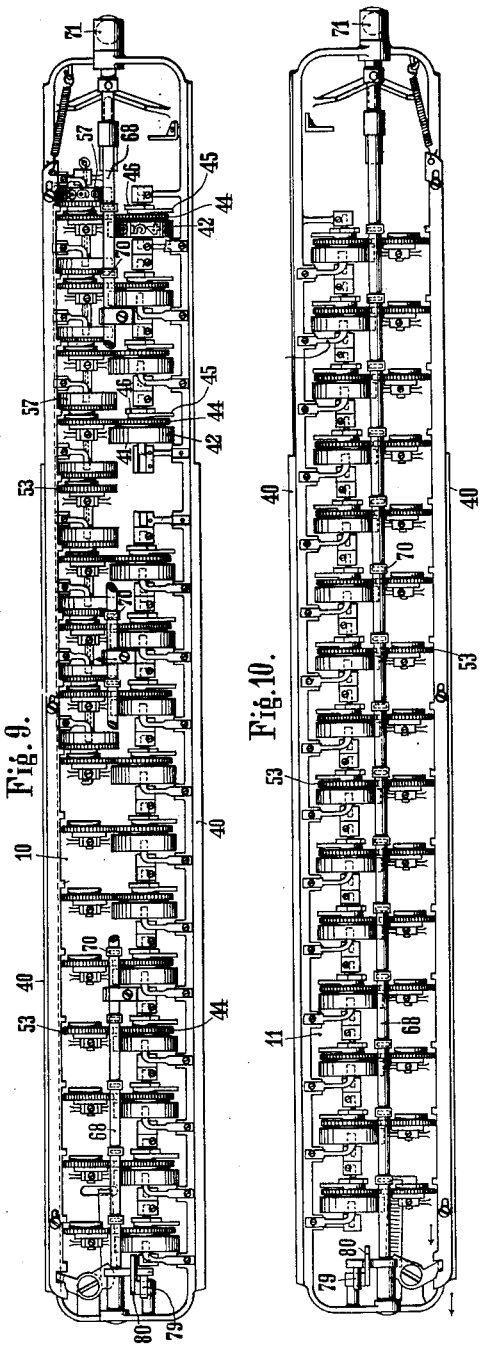

P. REISS.
CALCULATING MACHINE.
APPLICATION FILED OCT. 9, 1912.
1,156,313.
Patented Oct. 12, 1915.
8 SHEETS—SHEET 7.
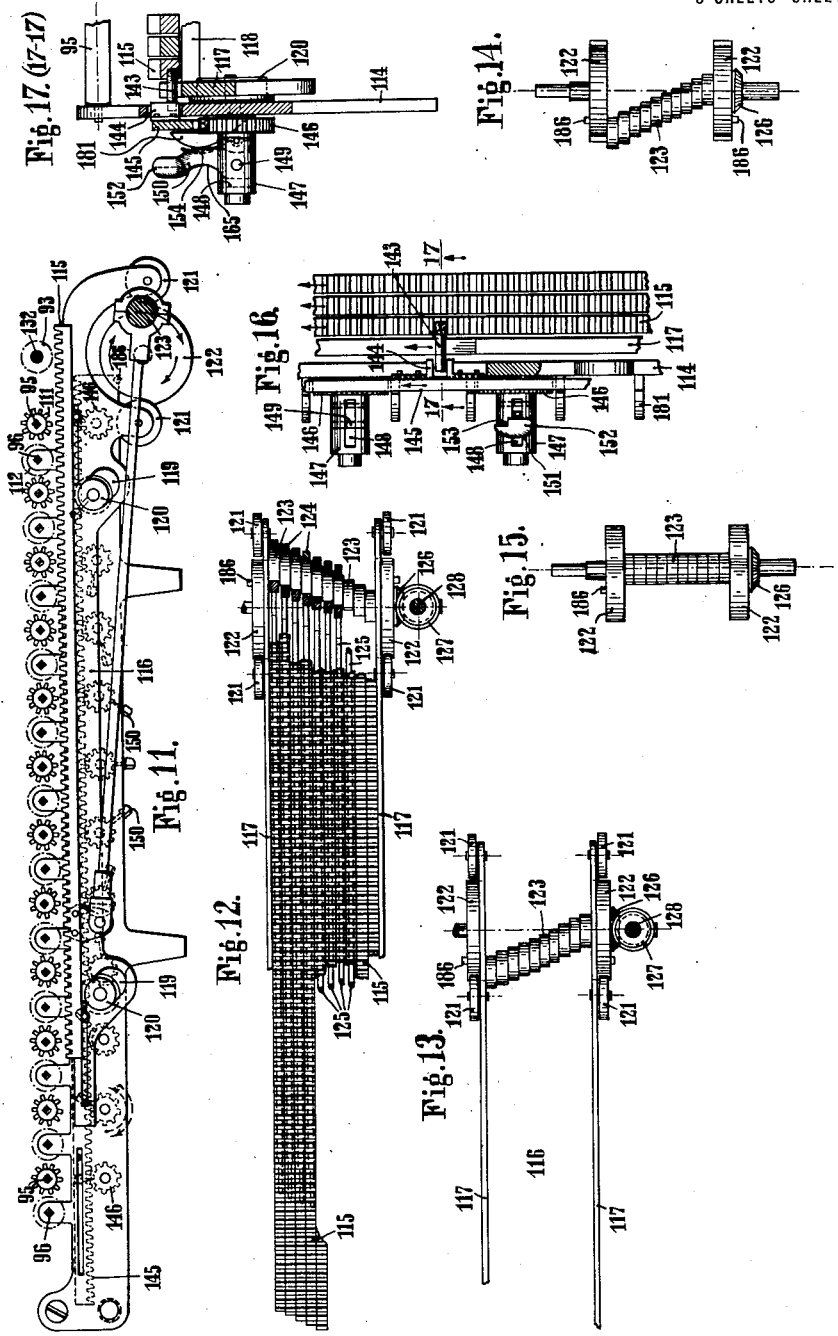
Witnesses:—
Edith C. Tate.
C. H. Potter.
Inventor
Paul Reiss
by Byrnes Townsend & Brickenstein
Atty's P. REISS.
CALCULATING MACHINE.
APPLICATION FILED OCT. 9, 1912.
1,156,313.
Patented Oct. 12, 1915.
8 SHEETS—SHEET 8.
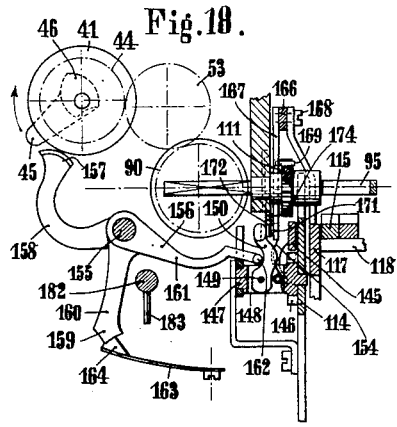
Fig. 18.
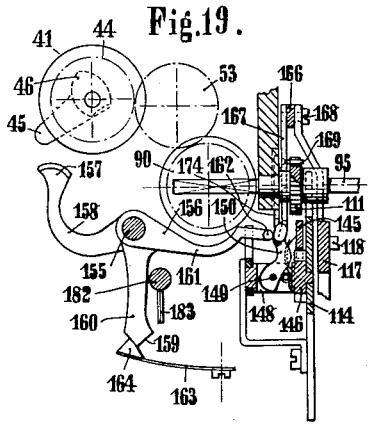
Fig. 19.
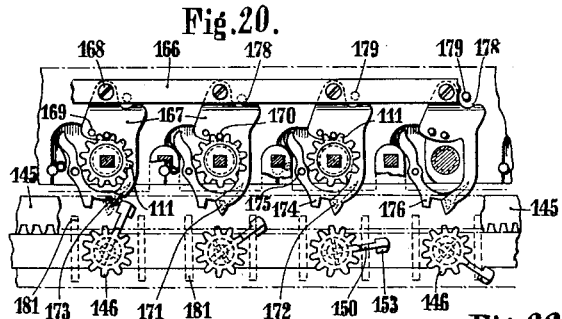
Fig. 20.
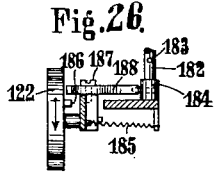
Fig. 26.
Fig. 27.
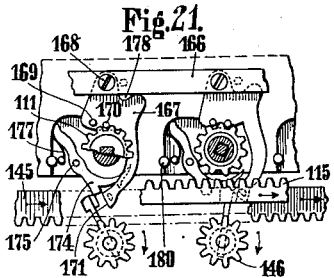
Fig. 21.
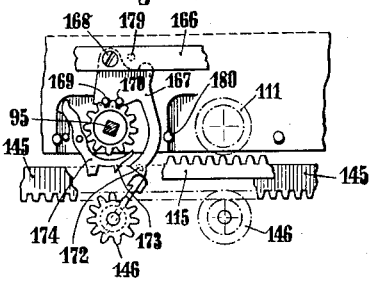
Fig. 22.
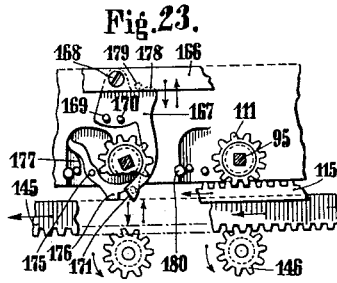
Fig. 23.
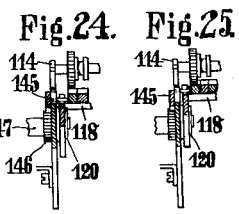
Fig. 24.  Fig. 25.
Witnesses—
Robert J. Hulsizer.
Edith C. Tate.
Inventor Paul Reiss
by Byrnes Townsend Brickenstein
attys.

UNITED STATES PATENT OFFICE.

PAUL REISS, OF BERLIN, GERMANY, ASSIGNOR TO BENNO KNECHT, OF BERLIN, GERMANY.

CALCULATING-MACHINE.

1,156,313.

Specification of Letters Patent.

Patented Oct. 12, 1915.

Application filed October 9, 1912. Serial No. 724,830.

*To all whom it may concern:*

Be it known that I, PAUL REISS, a citizen of the German Empire, residing at Berlin, Germany, have invented certain new and useful Improvements in Calculating-Machines, of which the following is a specification.

This invention relates to calculating machines and has for its object the construction of a machine which allows operation of two different computing devices by means of one set of actuating devices; and consists in special improved actuating and tens transfer mechanisms for calculating machines.

An embodiment of a machine in accordance with this invention is illustrated on the accompanying drawings, wherein:—

Figure 1:
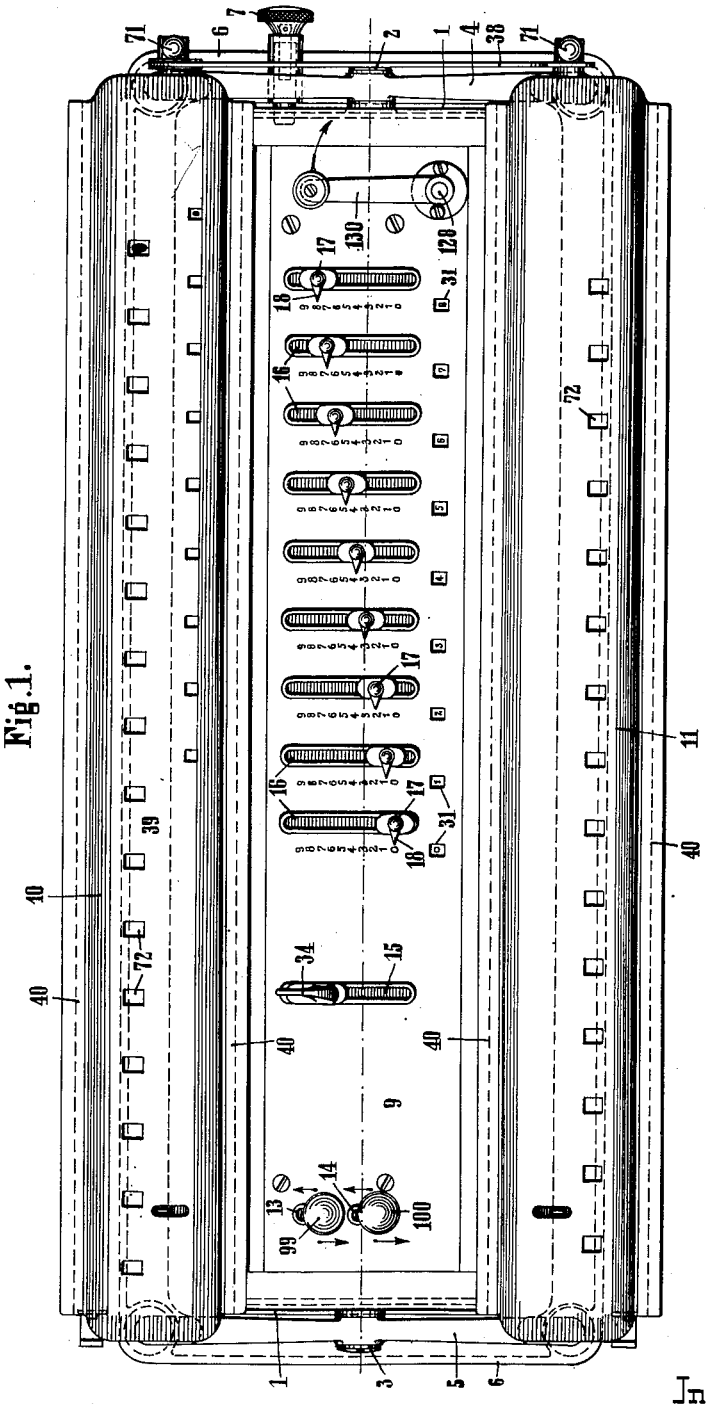
Figure 2:
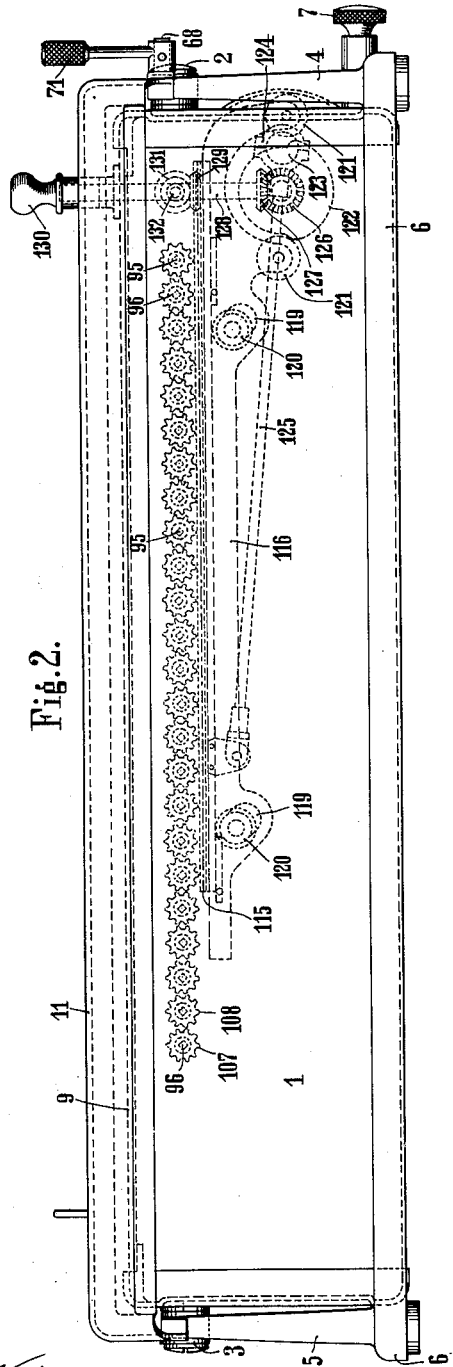
Figure 3:
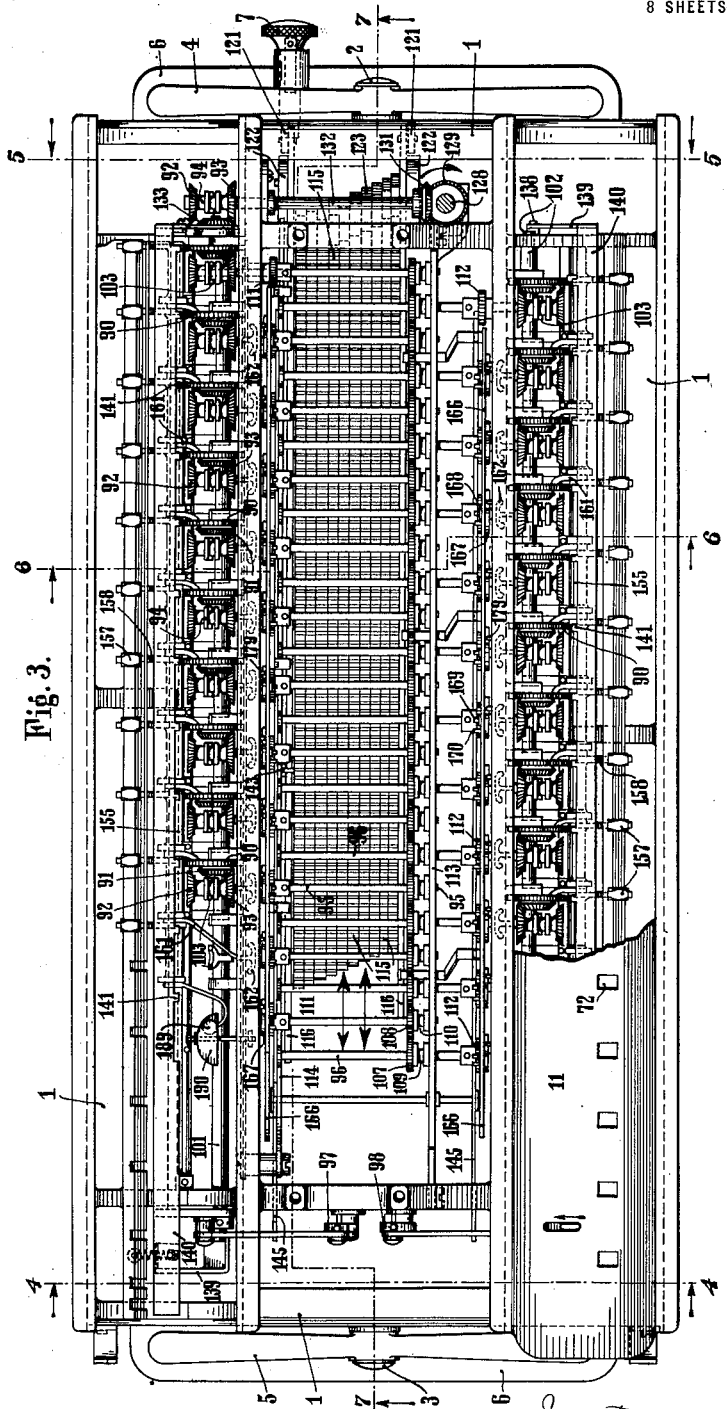
Figure 8:
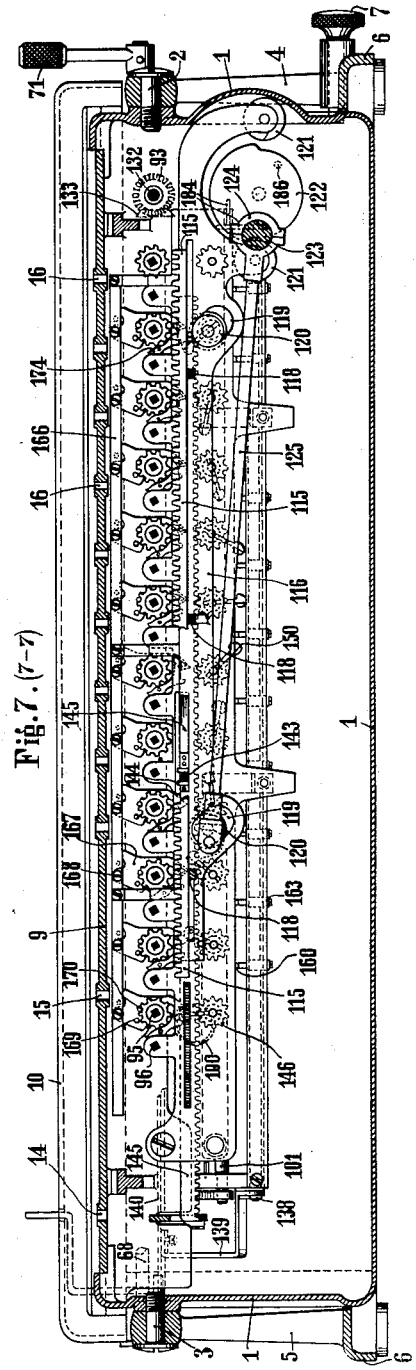

Figure 1 is a plan view of the machine; Fig. 2 a front elevation; Fig. 3 a plan view in which the upper slide and the setting plate have been wholly, and the lower slide partially, removed; Fig. 4 a section on line 4—4 of Fig. 3, viewed in the direction of the arrow, the upper slide having been removed; Fig. 5 a section on the line 5—5 of Fig. 3, as viewed in the direction of the arrow; Fig. 6 a section on the line 6—6 of Fig. 3, viewed in the direction of the arrow; Fig. 7 a section on the line 7—7 of Fig. 3, viewed in the direction of the arrow; Fig. 8 a broken section through the setting plate showing the setting knob and gear shifting arm; Fig. 9 a plan of the upper slide as seen from below; Fig. 10 a plan of the lower slide as seen from below; Fig. 11 a front view of the carriage in the lowered position; Fig. 12 a broken plan view corresponding to Fig. 11, and partly in section; Fig. 13 a plan of the carriage with the driving eccentrics turned through an angle of 180° from the position shown in Fig. 12, the racks being removed; Fig. 14 a plan view showing the stepped driving eccentrics together with the cams mounted at each end for effecting the movement of the rack carriage; Fig. 15 a plan view at right-angles to Fig. 14; Fig. 16 a plan view on an enlarged scale showing the connection between the nines rack and the operating device for the tens transfer; Fig. 17 a section on line 17—17 of Fig. 16, viewed in the direction of the arrow; Fig. 18 a section through the tens transfer before the setting of the control lever by the product wheel has been effected; Fig. 19 a section corresponding to Fig. 18 after the setting of the control lever by the product wheel has been effected; Fig. 20 a plan view at right angles to Fig. 19, in which the control lever and the parts belonging to the slide have been removed; Fig. 21 a plan view showing the transfer lever at the moment of the lever lock; Fig. 22 a plan view corresponding to Fig. 21 at the moment of the greatest throw of the transfer lever; Fig. 23 a plan view corresponding to Fig. 21, showing the rack carriage at the moment of its upward travel and the relocking of the transfer lever; Fig. 24 a section through the zero rack in the lowered position of the rack carriage; Fig. 25 a section through the zero rack in the raised position of the rack carriage; Fig. 26 a plan of the re-setting mechanism for the control levers; and Fig. 27 a front view at right angles to that of Fig. 26.

Referring to the drawings, the calculating machine having two slides, as illustrated, is arranged within a casing 1, which is pivoted in brackets 4, 5 of a supporting frame 6 by gudgeons 2, 3 provided at the end faces of the casing. The supporting frame 6 is provided at one end with a spring-actuated pin 7, and the end wall of the casing 1 opposite this pin is provided with corresponding holes 8 into which the pin 7 can snap to secure the casing 1 in a desired angle of inclination.

The calculating machine proper consists substantially of a setting plate 9, a slide 10 located above the plate and a slide 11 located below said plate. Beneath the setting plate 9 is located the actual driving mechanism which can operate simultaneously the two slides 10 and 11.

*The setting plate.*—The setting plate 9 (Fig. 1) is made from a cast iron plate 12 (Fig. 8) provided toward the end at the left hand as seen in Fig. 1 with slots 13, for the reversing levers, a slot 15 for the zero-setting handle and with a plurality of slots 16, in the present case nine, in which the setting knobs slide. The plate 12 is further provided with a bore through which the driving crank shaft is passed. In the slots 16 slide setting knobs 17 (Fig. 1) provided with indicating arms or pointers 18 which, coöperating with a correspondingly arranged scale of numerals, indicate the setting. The ends of the setting knobs 17 located beneath the plate 12 support carriers 19 (Fig. 8)

which are provided with two adjacent recesses 20 in order to entrain the driving wheels of the counting mechanism. The knobs 17 are coupled in any suitable way not shown on the drawing with numeral disks, the numerals of which are seen through the apertures 31 in the plate 12 and agree with those indicated by the pointers 18 (Fig. 1). The numerals appearing in apertures 31 and the setting knobs 17 may be returned simultaneously to zero position by actuating handle 34. This zero setting mechanism does not however form part of the present invention, and therefore is not particularly described or illustrated in the drawings.

*The two slides.*—According to the construction illustrated in the drawings, the calculating machine is furnished, as shown in Fig. 1, with an upper slide 10 and a lower slide 11. The two slides can be coupled together by a coupling 38 located at one end of the machine, so that they can partake in a common to-and-fro movement within their guides. The two slides can also be uncoupled so that each can be used independently of the other. In such calculating machines as may be intended for less complex calculations the lower slide 11 may be dispensed with, in which case the construction of the driving devices for the counting mechanism is also simplified to the extent that only half the number of driving spindles for the counting mechanism is required.

The upper slide (Fig. 9) consists of a casting 39 provided with lateral guides 40. The part 39 is furnished with two longitudinal series of small wheels, that is to say, a set of wheels for the product which give the result on the slides, and a set of quotient wheels which render possible a control of the number of revolutions of the crank. The product wheels 41 consist of numeral disks 42 and spur wheels 44 meshing with spur wheels 53, the last named spur wheels being in mesh with actuating spur wheels 90 (Fig. 4). The spur wheels 44 are provided with cranks 45 (Figs. 5 and 9) which are adapted to coöperate with the controlling levers for the tens transfer. On the same face of the spur wheels 44 there are mounted heart-shaped cams 46 forming part of the zero setting mechanism for the counting wheels, forming no part of this invention, and therefore not described in detail. The actual position of the product wheels can be read through apertures 72. The quotient wheels having numeral disks 57 are apportioned to a part of the product wheels only; they can be reset to zero position by actuating the longitudinal shaft 68 by handle 71. This also resets the product wheels 42 by means of crank arms 70 coöperating with cams 46 and with similar cams of the quotient wheels (not shown in detail).

*Actuating mechanism.*—Below the guides for the slides 10 and 11 are mounted spur wheels 90 (Fig. 4) which can coöperate with the intermediate wheels 53 (Fig. 9) for the product wheels, and which are provided at one side with bevel wheels 91 (Figs. 3 and 6) which engage with the one or the other of two bevel wheels 92, 93 on a sleeve 94 so that the spur wheel 90 is rotated either to the left or to the right. The sleeves 94 slide axially upon spindles 95, 96 arranged alternately, the spindles 95 hereinafter termed counting train spindles, operating on the upper slide 10, while the counting train spindles 96 operate on the lower slide 11. When the machine is provided with one slide only the spindles 96 as well as the portion connected therewith of the device for driving the counting train are obviously omitted. The sliding of the sleeves 94 whereby either the bevel wheel 92 or the bevel wheel 93 is brought into engagement with the bevel wheel 91 on the spur wheel 90, is effected by reversing arms 97, 98 respectively provided with knobs 99, 100, projecting through the corresponding slots 13 and 14 beyond the setting plate 9 (Figs. 1 and 4). The reversing arms 97 and 98 operate, through the medium of suitable intermediate members, rotatable spindles 101, 102 provided with forks 103 which engage in an annular groove in the sleeves 94 so as to move the sleeves to-and-fro in a longitudinal direction. The locking of the reversing levers 97 and 98 temporarily in position is effected by spring actuated pawls 104 adapted to snap into notches 105 in a member upon the spindles 101 and 102.

The spindles 95, 96 are each provided with a spur wheel 107, 108 respectively adapted to slide longitudinally of the spindle but to revolve with it and having respectively annular grooves 109, 110 in which the recessed portions 20 of the carrier 19 of the corresponding setting knob 17 can engage (Figs. 1, 3, 8). Each spindle 95 and 96 is further respectively provided, adjacent to the corresponding bevel wheel sleeve 94, with a spur wheel 111, 112 axially rigid and brought into operation on the tens transfer, the mode of operation of which will be explained hereinafter. The ends of the spindles 95 remote from the spur wheels 111 rest in a bearing plate 113 through which the spindles 96 are passed, a like plate 114 being provided for the free ends of the spindles 96. When the spindles 95 or 96 are turned they transmit their motion through the medium of the bevel wheel sleeves 94 to the spur wheels 90 and thence the intermediate wheels 53 of the product wheels of the slides 10, 11, whereby in a well-known manner with one slide, or with both slides simultaneously, one or two kinds of calculation can be carried out. This mode of using a calculating machine with one or two slides is perfectly well known and for that reason no further explanation is here required.

The driving of the spindles 95 and 96 through the medium of the spur wheels 107 and 108 is effected by a number of racks 115 which reciprocate, and which are periodically brought into the path of the spur wheels 107, 108 so that those spindles 95, 96, the corresponding spur wheels 107, 108 of which have been moved out of zero position by the corresponding setting knobs 17, are driven in a corresponding manner.

According to the present invention, a graduated speed is imparted to the racks 115, by giving each one separately a stroke corresponding to the numerical value appropriated thereto; that is to say, the rack 115 to which the number 9 is appropriated travels at a rate of speed nine times as great as that at which the rack to which the number 1 is appropriated, and so on. In this manner, when using the lower number during a revolution of the crank a lower absolute working speed in the counting-train driving-devices is attained resulting in a reduction in shock and wear and tear present in previous machines in which the same speed is apportioned to the driving devices for all the numerical values.

The whole of the racks 115 which rotate the spindles 95, 96 are mounted upon a rack carriage 116, formed substantially of two side portions 117 connected together by transverse members 118. The side portions 117 are provided with inclined slots 119 in which slide rollers 120 rotatably mounted on the machine casing. Each of the side portions 117 supports further a pair of rollers 121 which coöperate with driving cams 122. The circumference of each of these cams is formed with two semi-circles of different diameters. When the carriage during the first half of a revolution of the crank operates in conjunction with the portion of the circumference of greater radius, it and the racks resting upon it are raised during the travel in the slots 119 whereby the racks can engage with the wheels 107, 108; whereas when the rollers 121 engage with the periphery of smaller radius the rack carriage is lowered. The two driving cams 122 are connected together by a number of eccentric disks 123 arranged side by side, the lowest one, as seen in Fig. 12, being arranged concentric with the axis of rotation of the disk 122, while the remainder in succession have a graduated increase in eccentricity, so that the eccentricity of the second lowest eccentric disk 123, as seen in Fig. 12, is therefore 1/9 of the eccentricity of the highest eccentric disk 123. Each of these eccentric disks 123 is in linked connection with a rack 115 by means of an eccentric strap and rod 124, 125. When, as a result of the rotation of the cam disks 122, a rising and falling motion of the carriage 116 is produced, the racks 115 thereupon move to-and-fro in strokes the lengths of which correspond to the graduations in the eccentricity of the crank disks 123 with respect to the axis of rotation of the cam disks 122. The rack 115 therefore for the number 9 moves along a path nine times as long as that of the rack for the number 1, and as these movements are completed together during a revolution of the crank, it therefore follows that the racks 115 for the lower numbers are moved considerably slower than the racks for the higher numbers. Shocks and the like are in this way avoided, and the wear of the moving parts considerably reduced. Only the first rack 115 located in front has no to-and-fro movement imparted to it, and it travels with the carriage without any movement relative thereto in the path formed by the slot 119.

On the front cam disk 122 is mounted a bevel wheel 126 meshing with a bevel wheel 127 which is mounted on the lower end of the main driving spindle 128 (Figs. 2 and 12). The spindle 128 further carries a bevel wheel 129 which by means of bevel wheel 131 on spindle 132 (Fig. 5), bevel wheels 92 or 93 on sleeve 94 and bevel wheel 133 drives the quotient numeral disks 57 in a manner which needs no description and illustration in detail, as it forms no part of this invention and can be effected by an expert in any suitable way.

When the driving crank 130 is turned the rack carriage 116 is raised during the first half of the revolution while the racks 115 move to-and-fro with respect to the rack carriage. On the upward movement those spur wheels 107 and 108 on the spindles 95, 96 which have been set by the knobs 17 are brought into engagement with racks 115 appropriate to their numerical value, whereby they are rotated so that the numerical disks 42 of the product wheels are turned round to the extent of as many tenths of the circumference as may correspond to the numerical value in question to which the spur wheels 107 and 108 were set by their knobs 17. On each setting of the knob 17 a drive is effected toward both the slides, and by means of driving devices entirely independent of one another. Those spur wheels 107, 108, which were not moved from the zero position by the setting knobs 17, engage upon the raising of the carriage with the zero rack which has no reciprocating movement upon the rack carriage, and thus lock their spindles 95, 96 against inadvertent rotation as at this moment the locking device for the tens transfer is out of engagement (Figs. 21 and 25). The locking of the spindles 95, 96 during the movement of the slide is effected by a plate 140 on arms 139 pivoted at 138 (Figs. 3 and 4). The plate 140 is provided, opposite the spur wheels 90 with teeth 141. When the slide is moved the pivoted arm 80 under the influence of the pin 79 is moved to one side, whereby the plate 140 is swung about its pivot 138 so that the teeth 141 enter the spaces between the teeth on the spur wheels 90 and thus lock the whole of the counting mechanism. By means of springs 142 the plates 140 are returned to their normal position so as to release the spur wheels 90 and enable the machine to be again used.

*The tens transfer.*—The forward movement of the counting mechanism of the slide for the next higher denomination, as a product wheel of a lower denomination passes from 9 to 0, is effected in a machine according to the present invention by the reciprocating racks on the rising and falling rack carriage 116, and advantageously by that rack which has the longest stroke, viz. the "9" rack. With the object of driving the tens transfer devices, this rack is provided with a pin 143 (Figs. 16 and 17) which slides in a vertically slotted guide 144 on a rack 145 carried on the machine frame so that the "9" rack 115 imparts a reciprocating motion to the rack 145, while the pin 143 moves up and down in the slotted guide 144. The rack 145 works in gear with the spur wheels 146 (Figs. 16 to 23) of which one is arranged for each spindle 95 at the side of the slide 10 and one for each spindle at the side of the slide 11 (Fig. 3). Each spur wheel 146 is connected with a pin 147 provided between its bearing ends with a slot 148 in which a lever 150 is pivoted on a pin 149 so as to be capable of vibration in the direction of the axis of the pin 147. Each lever 150 is provided with a lateral arched guide face 151 and with an upper arched surface 152, the latter being provided with an angular recess 153. The vibrating levers 150 are subjected to the influence of springs 154 by means of which they are generally held in a normal position shown in Fig. 17. As may be seen in Fig. 20 of the drawings, each lever 150 is angularly displaced with respect to the lever of the preceding denomination to a certain extent, which however, does not permit of a greater difference than 360° between the position of the last and the position of the first levers, and the extent is generally considerably less.

Longitudinal spindles 155 below the slides 10 and 11 and upon which three-armed levers 156 are rotatably mounted extend from one end wall of the casing 1 to the other. Each of the levers 156 consists of a lever arm 158 provided with a rounded upper end 157, a depending lever arm 160 provided with an end having two faces converging to a point 159, and an arm 161 located in the plane of vibration of the lever 150 and provided toward its outer end with inwardly bent extremities 162 (Figs. 3 and 18). Adjacent each lever arm 160 there is arranged a spring 163 provided, opposite to the converging faces 159 of the lever arm 160, with an angle-piece 164, the sides of which make contact with one or the other edge of the end 159, so that the control lever 156 is held either in its position of control or in its normal position. The pivoted levers 150 opposite the end 162 are provided with a recessed portion 165 so that in the normal position of the lever 156 (Fig. 18) it is free to vibrate without being affected by the lever end 162. The levers 158 and 161 are relatively displaced with respect to the vertical plane, each lever end 157 lying in the plane of rotation of the cranks 45 of the product wheels, while the corresponding lever end 162 lies opposite that pivoted lever 150 which is appropriate to the counting mechanism of the next higher denomination.

At the side of both slides and above the toothed plates 145 there are connected with the carriage 116 plates 166 carrying arms 167 pivoted at 168. Each arm is provided with two pins 169 and 170, the latter of which in the lowered position of the carriage 116 lies within the spaces between the teeth on the spur wheels 111 mounted on the counting-train spindles 95, 96. The arms 167 are provided at the lower end with an inclined surface 171 and a pin 172 projecting to the rear. With this pin there is generally in engagement the hook-shaped end 173 of a locking lever 174 pivoted at 175 on the machine frame (Figs. 20 to 23). The levers 174 have further small lugs 176 projecting laterally from the hooked end 173 and are subjected to the influence of springs 177 which tend to rotate the levers 174 in the direction of the clock. The pivoted arms 167 are provided adjacent to their pivot pins 168 with guiding edges 178 above which are arranged on the machine-frame pins 179. Further, a stop-pin 180 is provided at one side of each arm 167 for limiting the outward swing of the arm. Beside each pivoted arm 150, on the machine-frame, are provided curved rigid guide-pieces 181 (Figs. 16 and 17).

Behind the crank arms 160 of the control levers 156 there passes in the machine-frame a longitudinal spindle 182 (Figs. 5, 18, 19, 26 and 27), which is provided opposite each crank-arm 160 with a pin 183. The spindle 182 is provided at the end facing the cams 122 (Figs. 11 and 27) with a rigid arm 184. The spindle 182 is subjected to the influence of a spring 185 having one end attached to the frame of the machine, and tending to turn the spindle so as to move the pins 183 out of contact with the crank-arms 160. Each of the cams 122 is provided with a preferably adjustably arranged striking-pin 186 which, during the revolution of the cam 122, at a given moment comes into contact with one end of a double-armed lever 188 pivotally mounted upon a pin 187, while the other arm of said lever rests on the crank arm 184 of the spindle 182.

The mode of operation of the above-described device is as follows:—Normally the pivoted arms 167 are in the position shown for example in Fig. 20 in which they are secured by the locking levers 174. When the carriage 116 rises and falls under the influence of the cam disks 122 the pins 170 drop into the spaces between the teeth on the spur wheels 111 in the lowered position of the carriage, so that the corresponding spindles 95, 96 are locked against an unintentional rotary movement during the time the zero rack 115 is out of engagement with the spur wheels 107, 108. The pivoted arms 150 are then in the position shown in Fig. 18 in which they are free to swing past the curved ends 162 of the lever arms 161. As the rack 145, which drives the spur wheels 146 connected with the pivots 147 of the levers, is coupled to the "9" rack 115, without vertical movement, it follows that the whole of the pivoted arms 150 swing to-and-fro during a revolution of the main driving-crank 130. The pivoted arms 167 during their up and down movement with the carriage are secured by the locking-levers 174, the pins 172, during the up and down motion of the carriage, sliding along the lower edge provided between the projecting portion 176 and the hook 173 on the locking-lever 174 which is immovable on the machine frame in the vertical position.

As a product wheel moves over from 9 to 0, the crank-arms 45 of the product wheels are brought into engagement with the ends 157 of the control levers 156 causing the levers 156 to rotate somewhat, whereupon the parts take up the positions shown in Fig. 19, the control lever after movement being held by the angle-piece 164 on the spring 163. By this rotary movement the bent end 162 of the lever arm 161 arrives in the path of the curved surface 151 of the pivoted arm 150 of the next higher denomination, so that when this pivoted arm passes the end 162 it is partially rotated about its pivot 149 against the influence of its spring 154, whereby the curved upper surface 152 is brought under the lug 176 of the locking lever 174, and the recessed portion 153 into the path of the inclined edge 171 of the pivoted arm 167 (Figs. 20 to 23). This takes place while the carriage is in its lowered position and the rack is on its return stroke. As a consequence of the contact between the surface 152 and the lug 176, a rotary movement of the locking-lever 174 takes place so that the hook 173 is removed from the pin 172, thus releasing the pivoted arm 167. As the pivoted arm 150 moves farther, the recessed portion 153 meets the edge 171 so that the pivoted arm 167 rotates, whereupon the pin 169 is brought to bear upon the spur wheel 111 which then imparts a forward movement to the corresponding product wheel to the extent of a single number (Fig. 22). The outward swing of the pivoted arm 167 is then limited by the stop pin 180. When the carriage again rises, after a tens transfer has been effected, the guide edge 178 slides over the pin 179, thus imparting to the pivoted arm 167 a positive rotary movement during which the pin 172 passes over the outer edge of the hook 173 so that the locking-lever 174 is rotated against the influence of its spring 177, while the hook 173 again snaps over the pin 172, thus again securing the pivoted arm until the next tens transfer is to take place.

As a consequence of the relative angular displacement of the pivoted levers 150, the pivoted arms 167 come into operation one after another at different times, so that a false transfer is avoided. As soon as the last pivoted arm 150 has passed the curved end 162 of its lever arm 161, the pin 186 (Fig. 27) passes one end of the lever 188 causing it to vibrate, so that the spindle 182 is rotated by the crank-arm 184 against the influence of the spring 185. The pins 183 are thereby brought into contact with the adjacent edges of the lever arms 160 returning the whole control lever 156 to its normal position. As soon as the normal position has been again taken up, the pivoted arms 150 are swung back to their normal position under the influence of the springs 154. Those pivoted arms which for any reason stick fast in their slots 148 so as not to be pressed forward by their springs 154, are brought into engagement at the next pass with the rigid guide-piece 181, and positively returned thereby to their normal position.

It remains to be noted that the control-lever 156 appropriated to the highest denomination is provided with a clapper 189 instead of a lever-arm 161, so that a gong 190 is sounded in the usual manner as the machine is about to go beyond the highest number, for which it is arranged.

The mode of using the above-described calculating machine in no way differs from that employed with the usual calculating machine with one or two slides; the rules and instructions for use common to machines up to the present time on the market apply equally well to the machine according to the present invention.

I claim:—

1. In a calculating machine, the combination with a computing device of a plurality of racks for actuating said computing device, a movable carrier for the same mounted to bring the racks into and out of engagement with said computing device, actuating means for said carrier, a series of cranks of progressively increasing eccentricity connected with the several racks respectively to reciprocate the same on actuation, and means for actuating said cranks in dependence from said rack carrier.

2. In a calculating machine, the combination with computing devices of an actuating carriage, racks carried by said carriage for actuating the said computing devices, said carriage being movable with a reciprocatory motion to bring the racks into and out of engagement with said computing devices, said racks being supported for a reciprocating movement upon said carriage, two cams adapted to reciprocate the said carriage and connected by a series of cranks of progressively increasing eccentricity and adapted to reciprocate the racks upon said carriage during the reciprocation thereof with progressively increasing strokes, and means for rotating the said cams and the said cranks.

3. In a calculating machine, two sets of computing devices each carried by a slide, one actuating carriage carrying racks for actuating said two sets of computing devices and movable with a reciprocatory motion to bring the racks into and out of engagement with said computing devices, said racks being supported for a reciprocating movement upon said carriage, and each rack being adapted to actuate simultaneously upon both computing devices, actuating means for said carriage comprising a series of cranks of progressively increasing eccentricity coupled with the several racks respectively, and means for actuating said cranks in dependence from said carriage.

4. In a calculating machine, two sets of computing devices each carried by a slide, one actuating carriage carrying racks for actuating said two sets of computing devices and movable with a reciprocatory motion to bring the racks into and out of engagement with said computing devices, the said racks being supported for a reciprocating movement upon said carriage, and each rack being adapted to actuate simultaneously upon both computing devices, two cams adapted to reciprocate said carriage and connected by a series of cranks of progressively increasing eccentricity and adapted to reciprocate said racks upon the carriage during the reciprocation thereof with progressively increasing strokes, and means for rotating said cams and said cranks.

5. A calculating machine comprising two computing devices and an actuating device for the same having two sets of actuating shafts, each set acting upon one of said two computing devices, said actuating shafts being arranged side by side and the shafts of the one set alternating with the shafts of the other set.

6. A calculating machine comprising two slides, computing devices carried by said slides, and an actuating device for the computing devices of said slides, said actuating device having two sets of actuating shafts, each set acting upon the computing device of one of both slides, the actuating shafts of both sets of shafts being arranged side by side, and the shafts of one set alternating with the shafts of the other set, and one actuating member for each pair of actuating shafts.

7. A calculating machine comprising two computing devices, a bed of toothed racks reciprocally mounted on a movable carrier, means for reciprocating said racks upon said carrier with progressively increasing strokes, two sets of actuating shafts, longitudinally adjustable transmitting gears carried by said actuating shafts, means for adjusting the transmitting gear of a shaft of one set of shafts simultaneously with the transmitting gear of a shaft of the other set of shafts, and means for moving the rack carrier to bring the racks into and out of engagement with said adjustable transmitting gears, the racks and the transmission gears being in such correlation that each two correlated transmission gears on each adjustment engage only one of the several racks.

8. A calculating machine comprising a computing device having tripping means, an actuating carriage, racks carried by said carriage for actuating said computing device and being movable with a reciprocating motion to bring the racks into and out of engagement with said computing device, said racks being supported for a reciprocating movement upon said carriage and with strokes graduated according to the numerical value of each rack, and a common actuating member for said tripping means and actuated by the rack having the greatest stroke of all the racks.

9. In a calculating machine, the combination with a computing device of an actuating member for same, a longitudinally shiftable rack in operative connection with said actuating member so as to be reciprocated thereby, spur-wheels meshing with said reciprocating rack, cranks carried by said spur-wheels angularly displaced with relation to each other and adapted to effect tens transfer during shifting of their actuating rack in one direction and inoperative in the other.

10. In a calculating machine, the combination with a computing device of an actuating member for same, a longitudinally shiftable rack in operative connection with said actuating member to be reciprocated thereby, spur-wheels meshing with said reciprocating rack, cranks carried by said spur-wheels angularly displaced with relation to each other, the cranks forming levers having their axes crossing the axes of the spur-wheels, controlling-means for the crank-levers operated in dependence from the actuation of the number wheels of the computing device, said crank-levers adapted to be swung by said controlling-means into operative position for tens transfer in said computing device.

11. In a calculating machine, the combination with a computing device of a system of longitudinally shiftable racks for actuating said computing device and means for reciprocating the different racks with different velocity, means for intermittently bringing said racks into gear with the computing device, a longitudinally shiftable rack permanently out of gear with the computing device but in operative connection with a rack of said first mentioned system of racks so as to be reciprocated thereby, spur-wheels meshing with said last-named rack, cranks carried by said spur-wheels angularly displaced with relation to each other and adapted to effect tens transfer during shifting of their actuating rack in one direction and inoperative in the other.

12. In a calculating machine, the combination with a computing device of a carriage for same, actuating-racks carried by said carriage, means for intermittently bringing the racks of the carriage into and out of operative connection with the computing device and for reciprocating the racks, tens transfer pawls mounted on said carriage and adapted to be brought out of operative position with relation to said computing device when the racks are in operative connection and vice versa, a reciprocating rack mounted independently of said carriage but in operative connection with the shiftable racks thereon, spur-wheels meshing therewith, cranks carried by said spur-wheels angularly displaced with relation to each other and adapted to operate on said tens transfer pawls while said actuating racks are out of operative connection with the computing device.

13. A calculating machine comprising a frame, a counting-slide longitudinally adjustable in said frame and carrying computing means, an actuating device adapted to act upon said computing means, means for locking the counting-slide in its adjusted positions, means for locking the counting-slide in an inoperative position, and means for automatically locking the actuating device upon releasing said counting-slide.

In testimony whereof I affix my signature in presence of two witnesses.

PAUL REISS.

Witnesses:
  HENRY HASPER,
  WOLDEMAR HAUPT.